Aug. 13, 1968 F. P. ALLES 3,397,072
MAGNETIC RECORDING TAPE WITH AN ASYMMETRICALLY ORIENTED TEREPHTHALATE POLYMER SUPPORT
Filed Aug. 28, 1959
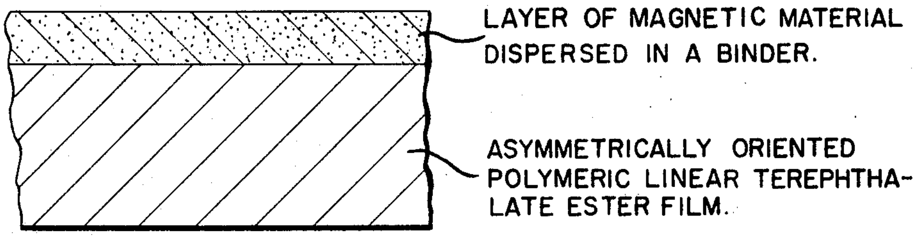
INVENTOR
FRANCIS PETER ALLES
BY Herbert M. Wolfson
ATTORNEY United States Patent Office 3,397,072

Patented Aug. 13, 1968

3,397,072

MAGNETIC RECORDING TAPE WITH AN ASYMMETRICALLY ORIENTED TEREPHTHALATE POLYMER SUPPORT

Francis Peter Alles, Westfield, N.J., assignor to E. I. du Pont de Nemours and Company, Wilmington, Del., a corporation of Delaware Continuation-in-part of application Ser. No. 629,443, Dec. 20, 1956. This application Aug. 28, 1959, Ser. No. 836,602

6 Claims. (Cl. 117—7)

This application is a continuation-in-part of my copending application Ser. No. 629,443, filed Dec. 20, 1956, and now abandoned.

This invention relates to magnetic recording tape and more particularly to such a tape wherein a layer of magnetically susceptible material dispersed in a binder is supported by a flexible asymmetrically oriented polymeric film.

Magnetic sound and video recording tapes are known to comprise magnetically susceptible or magnetizable particles dispersed throughout a non-magnetic binder in the form of a thin layer coated on a flexible supporting film or web. It is known that such a supporting film or web may be a polymeric film composed of a linear terephthalate ester, e.g., polyethylene terephthalate, which has been oriented substantially uniformly by stretching while in the amorphous state substantially equally, i.e., on the order of about 3× its original dimensions both in the transverse and longitudinal directions of the film.

Such films while satisfactory in many respects, however, particularly when extremely thin, do not possess adequate strength in the longitudinal direction and may break when subjected to the high inertial forces encountered in starting and stopping reels of tape. If such forces do not break the tape, they may stress it beyond its elastic limit or yield point and thereby cause permanent deformation or elongation. Of course any temporary or permanent change in the length of the tape during or after recording alters the fidelity of the recording. If the tape is thin and the yield strength is low, small variations in tension cause the tape to elongate, resulting in flutters in the recording which are particularly troublesome when recording high frequencies.

Changes in humidity and temperature are known to result in a reversible change in the length of magnetic tape. Changes in length occurring between the time a recording is made and played back may result in an undesirable error in program timing or loss of fidelity in the recording. Magnetic tapes are also subjected during use to transverse stresses, as a result of tension, which may cause the tape to tear or break.

It is therefore an object of this invention to provide a magnetic recording tape which can tolerate the application of high longitudinal stresses. Another object of this invention is to provide such a tape which will not be easily elongated or permanently deformed during use. A further object of this invention is to provide such a tape which does not readily tear. A still further object is to provide such a tape which has a high degree of dimensional stability on exposure to relative changes in temperature and humidity. An additional object is to provide such a tape having a high degree of fidelity in sound and video recording and play back. Yet another object is to provide such a tape which is very thin, thus allowing a greater amount of footage per standard size reel and exhibiting a reduced stiffness which enables the tape to conform more readily to the surface of the recording and play back heads. Other objects will be apparent from the following description of the invention.

The sole figure of the drawing is a cross-sectional view of a magnetic recording tape prepared in accordance with the teachings of this invention.

The magnetic recording tape of this invention comprises a thin layer of a magnetically susceptible material dispersed in a binder coated on a flexible support, said support comprising an asymmetrically oriented polymeric linear terephthalate ester film. In an important aspect, the magnetic recording tape comprises a layer of a magnetically susceptible material dispersed in a binder coated on a flexible support, said support comprising a polymeric linear terephthalate ester film which has been oriented by stretching to a greater extent in the longitudinal direction than in the transverse direction of the film, e.g., the film has been oriented by stretching in an amount from 3.4× to 5.0× in the longitudinal direction and from 1.2× to 3.0× in the transverse direction. The film may be stretched from 3.4× to 6.0× in the longitudinal direction and from 1.2× to 4.0× in the transverse direction provided that the amount of stretch in the longitudinal direction exceeds the amount of stretch in the transverse direction by at least 1.0×.

The supporting films having the asymmetrical orientation comprehended by this invention may be made in several ways. For example, a substantially amorphous polymeric linear terephthalate ester film which may be formed by extrusion from an orifice is stretched between 3.4× to 6.0×, preferably 3.4× to 5.0× in one direction and between 1.2× to 4.0×, preferably 1.2× to 3.0× in the cross or transverse direction, the amount of stretch in the first direction being at least 1.0× more than the amount of stretch in the transverse direction, at a temperature between about 80° and 120° C. and heat set under tension at a temperature between about 140° and 250° C. The stretching of the amorphous film may be carried out simultaneously in both directions or by stretching the film first in either direction followed by stretching in the other direction. In an alternate process for effecting the desired orientation of the amorphous film, the film may first be stretched in one direction to a greater degree than is ultimately desired and subsequently stretched in the opposite direction (the transverse direction) the desired amount while permitting the film to neck in or draw down in the direction of the first stretch, thereby obtaining a film having asymmetrical orientation within the specified limits.

Another method for producing the asymmetrically oriented supporting film comprises stretching in one direction from about 1.2× to 1.8× at a temperature between about 25° C. and 205° C. a polymeric linear terephthalate ester film, e.g., a polyethylene terephthalate film, which has been substantially uniformly oriented by stretching in both directions at least 2.5× its initial dimensions, and heat setting at a temperature between about 140° C. and 250° C., preferably between about 150° C. and 200° C.

Films produced according to the aforementioned methods have unusual physical properties including a tensile strength on the order of 30,000 to 50,000 p.s.i. or higher in the direction of the greater amount of stretch, a modulus (measure of stiffness) in the same direction on the order of 700,000 p.s.i. to 1,200,000 p.s.i. or higher, a tear strength or tear resistance from 2 to 6 times greater than symmetrically oriented terephthalate ester films and superior yield strength and dimensional stability under conditions of varying temperature and humidity.

In making the novel magnetic recording tapes of this invention, pulverized or finely powdered magnetically susceptible, i.e., magnetizable, particles are dispersed in a suitable binder which is coated on the supporting film, with or without an intervening layer for improved adherence.

The magnetic material, i.e., magnetically susceptible material, is not especially critical and can readily be selected by persons skilled in the art. Suitable materials include ferromagnetic $Fe_2O_3$, $Fe_3O_4$, e.g., of the type disclosed in U.S. Patent No. 2,694,656, chromium oxides which are described in Arthur U.S. application Ser. No. 515,521 filed June 14, 1955, and now abandoned, Swoboda U.S. application Ser. No. 515,523 filed June 14, 1955, and now abandoned, and Oppegard U.S. Patent No. 2,885,365 and ilmenite type ferromagnetic manganese complexes as described in Toole U.S. Patent No. 2,770,523.

Suitable binding materials for the magnetic particles include polymeric materials, e.g., a cellulose derivative such as cellulose acetate, cellulose nitrate, cellulose acetate propionate, a synthetic resin or super polymer, e.g., a polymethyl methacrylate/phenol formaldehyde condensation product, polystyrene, nylon, vinylidene chloride copolymers with ethylenically unsaturated monomers, e.g., vinyl chloride, vinyl acetate, isobutylene, acrylonitrile, etc. The binding materials can be used as fluids or solutions in suitable organic solvents. The preferred binding material is polyvinyl butyral.

The binder may also contain dispersing agents, e.g., tetraisopropyl titanate, dioctyl ester of sodium sulfosuccinic acid and mixtures of the latter with stearic acid. The binder may also contain plasticizers, lubricants, stripping aids and other additives. For convenience, to assist a user in readily distinguishing between the magnetically active surface of the tape and the support side of the tape, a suitable dye or pigment may be added to the binder. The dispersion of the magnetic material in the binder may be accomplished by ball milling or other suitable means as in a roll, colloid or burrstone milling apparatus.

The ratio of magnetic material to binder may be in the range of 3:1 to 15:1 depending on the particle size, shape and character of the particular binder being used.

The present invention will be further illustrated and explained but is not intended to be limited by the following examples wherein the parts stated are parts by weight.

EXAMPLE I

Substantially amorphous polyethylene terephthalate was extruded through an orifice in the form of a film which was then stretched at a temperature of approximately 85° to 95° C. in apparatus of the type described in U.S. Patent No. 2,728,941. The film was stretched approximately 4× longitudinally (in the machine direction) while simultaneously being stretched approximately 1.6× transversely (in the cross direction). The film was then heat set at about 185° C. under tension such that no shrinkage occurred.

A dispersion of magnetic oxide was made by ball milling for 72 hours 100 grams of acicular $Fe_3O_4$, 221 milliliters of toluene, 1 gram of stearic acid, 1 gram of the dioctyl ester of sulfosuccinic acid and 2 grams of methylol stearamide. Ten grams of a 20% solids solution of polyvinyl butyral (having 2.5% polyvinyl acetate and an hydroxyl content of 13 to 21% calculated on the weight of polyvinyl alcohol and a viscosity in 10% solution in ethanol of about 23 to 35 centipoises at 25° C.) was added and grinding continued for six hours. Fifteen grams of the polyvinyl butyral solution was then added, the grinding continued for 1.5 hours, an additional 25 grams of the polyvinyl butyral solution and 60 milliliters of tertiary butanol were added and the dispersion filtered. The dispersion was then coated on the stretched and heat set polyester film, using a doctor blade to obtain a dry coating thickness of 0.0005 inch. The coating, dried at room temperature and then heated at about 85° C. for 10 minutes, was smooth, and the tape was flat.

Upon testing, the magnetic recording tape of this example was observed to tolerate an applied load in the longitudinal direction of 45,500 p.s.i. without breaking. A sample of this tape ¼ inch wide exhibited no apparent deformation when subjected to a longitudinal load of 1,000 grams for about 30 seconds. In addition, the tape exhibited a modulus (as hereinafter explained) in the longitudinal direction in excess of 1,200,000 p.s.i., an elongation of less than 50% and a tear strength of greater than 80 grams per mil in both the longitudinal and transverse directions.

EXAMPLE II

Polyethylene terephthalate film .0005 inch thick, which had been stretched approximately 3× longitudinally and 3× transversely and heat set at about 175° C., was further stretched 1.7× in the longitudinal direction at 125° to 130° C. and heat set at 160° C. for 3 seconds. The film was not restrained from shrinking laterally during the unidirectional 1.7× stretching and heat setting. By this second stretching step the tensile strength of the film in the longitudinal direction was increased from 17,400 p.s.i. to 33,500 p.s.i. and the yield strength was increased from 13,200 p.s.i. to 27,900 p.s.i.

A dispersion of magnetic oxide as in Example I was coated on the asymmetrically oriented polyester film as in Example I to produce a magnetic tape having excellent reproducing properties.

EXAMPLE III

A polyethylene terephthalate film which had been substantially uniformly oriented by stretching about 3× in both the longitudinal and the transverse direction was further stretched about 1.4× on a multiple roll of the type described in U.S. Patent No. 2,767,435 at a temperature of about 140° C. and heat set at a temperature of about 190° C. while under tension sufficient to prevent shrinkage. A dispersion of magnetic material was made by ball milling 42 grams of $Fe_2O_3$ magnetic particles, 50 milliliters of toluene and 2 grams of stearic acid for 48 hours. 40 grams of a 25% solid solution in toluene of a chlorosulfonated polyethylene of the type described in U.S. 2,212,786, U.S. 2,416,060 and U.S. 2,416,061, containing approximately 27.3% chlorine and 1.5% sulfur, wherein most of the chorine is substituted along the hydrocarbon chain and sulfur is combined with chloride and attached to the carbon chain as sulfonyl chloride ($SO_2Cl$), were added and grinding continued for 72 hours. The dispersion was filtered and cast onto a smooth plate glass surface using a doctor blade coater to obtain a dry layer thickness of 0.0005 inch. The above described asymmetrically oriented polyethylene terephthalate film 0.001 inch thick and coated with a pressure-sensitive adhesive was rolled into contact with the magnetic layer, and the laminated structure stripped from the glass plate. The surface of the magnetic layer was a replica of the glass surface and extremely smooth, being on the order of 2 to 5 microinches (root mean square) in smoothness.

Upon testing and comparison with a similar magnetic recording tape having as a support a substantially uniformly oriented polyethylene terephthalate film (stretched about 3× in both directions), the tape of this example was observed to have a tensile strength in the longitudinal direction more than twice that of the uniformly oriented tape, a modulus in the longitudinal direction more than twice that of the other tape, a yield strength more than 2 times that of the other tape, a tear strength in the transverse direction 2 times that of the other tape, a dimensional change in the longitudinal direction due to humidity only 0.5 as great as the other tape, and a change due to temperature only 0.1 as great.

EXAMPLE IV

A dispersion of magnetic material was made by ball milling 100 grams of acicular $Fe_2O_3$, 50 milliliters of acetone, and 2 grams of the dioctyl ester of sulfosuccinic acid for 10 hours. 20 grams of a 25% solids cellulose nitrate solution in methanol were added and grinding continued for 5 hours, after which 20 grams more of the cellulose nitrate solution were added to obtain a 10:1 magnetic particle to binder ratio. A polyethylene terephthalate film 0.0005 inch thick coated with a copolymer of vinylidene chloride/methyl/acrylate/itaconic acid which had been stretched substantially uniformly approximately 3× by 3×, as described in U.S. Patent No. 2,627,088, was asymmetrically oriented as described in Example II. The dispersion of magnetic material was coated on the polyester film using a doctor blade to obtain a dry thickness of 0.0005 inch. Adhesion was satisfactory, and the resultant magnetic tape exhibited outstanding characteristics as in the previous examples.

EXAMPLE V

Example IV was repeated except that the polyethylene terephthalate film was coated with a solvent soluble polyester of the type described in U.S. Patent No. 2,698,239 with similar results.

EXAMPLE VI

Example III was repeated except that the magnetic dispersion comprised 70 grams of acicular ferro-magnetic chromium oxide, 0.7 gram stearic acid, 0.7 gram of the dioctyl ester of sulfosuccinic acid, 100 milliliters of toluene, 100 milliliters of tertiary butyl alcohol which had been ball milled for 72 hours, after which was added 51 grams of a 20% solids solution of the polyvinyl butyral described in Example I in a 1:1 toluene/tertiary butyl alcohol solvent mixture. The mixture was ball milled 48 hours and filtered. The resultant magnetic tape of this example also exhibited outstanding characteristics as in the previous examples.

EXAMPLE VII

Examples II, III, IV, V and VI were repeated except that the supporting film was that of Example I. The resultant magnetic tapes exhibited outstanding characteristics as in the preceding examples.

EXAMPLE VIII

Examples II, III, IV, V and VI were repeated except that the supporting film was a substantially uniformly oriented polyethylene terephthalate film 0.0005 inch thick which was subsequently hand stretched about 1.6× at room temperature (about 23° C.) in a longitudinal direction with no lateral restraint. The resultant magnetic tapes of this example also showed the improved characteristics as in the previous examples.

EXAMPLE IX

Substantially amorphous polyethylene teraphthalate film was prepared by extruding molten polyethylene terephthalate at a temperature of about 280° C. onto a quench drum where it was chilled to a temperature of about 75° C. and then stretched transversely in a tenter frame, the extruder and tenter frame being similar to that described in U.S. Patent 2,823,421. The amount of stretch imparted to the film in the transverse direction (TD) was 3.5 times (3.5×) its original width. Stretching was performed at a temperature of 85° C.

The film was heated and held at 110° C. for a few seconds on an extension of the tenter frame to increase the crystalline level of the film. The film was then stretched in the longitudinal or machine direction (LD) to an extent of 5.6× at a temperature of 180° C. in a conventional nip roll stretching apparatus. The apparatus used comprised a nip roll web stretcher of two sets of differentially driven pull rolls. The first set of rolls included a radiantly heated top roll covered with silicone rubber and an inductively heated metal coated bottom roll. The second set of rolls included a neoprene covered top roll and a metal plated bottom roll. The amount of stretch was controlled by varying the differential speeds of the two sets of rolls in amounts to effect a longitudinal stretch of 5.6× based on the length of the film prior to longitudinal stretching.

The film was then heat treated (heat-set) in the nips of a set of driven rolls heated to a temperature of 215° C. while the film was held under tension. The film was cooled and released.

A dispersion of magnetic oxide was prepared and coated on the film in the manner described in Example I.

Table I below lists the physical properties of the magnetic recording tape prepared above.

Table I

| | |
|---|---|
| Modulus, p.s.i.: | |
| LD | 11.7×10⁵ |
| TD | 5.3×10⁵ |
| Tensile strength, p.s.i.: | |
| LD | 42,100 |
| TD | 13,100 |
| Elongation, percent: | |
| LD | 10.5 |
| TD | 13.3 |

EXAMPLE X

Substantially amorphous polyethylene terephthalate film, extruded and quenched as in Example IX, was first stretched in the transverse direction in a tenter frame to an extent of 3.5× at a temperature of 85° C. The film was then stretched longitudinally between the nips of two sets of differential speed pinch rolls to an extent of 5.8× at a temperature of 170° C. The film was then heat treated (heat-set) at a temperature of 200° C. while the film was held under tension.

Table II, below, lists the physical properties of the resulting film.

Table II

| | |
|---|---|
| Modulus, p.s.i.: | |
| LD | 11.4×10⁵ |
| TD | 4.4×10⁵ |
| Elongation, percent: | |
| LD | 6.0 |
| TD | 52.7 |
| Tensile strength, p.s.i.: | |
| LD | 40,600 |
| TD | 13,600 |

As used herein, tensile strength is intended to mean the force, conveniently expressed in pounds per square inch (p.s.i.), which is required to break the film at room temperature. Modulus, also expressed in p.s.i., and determined as described hereinafter, is a measure of stiffness or force required to bend the material. Elongation is the extent to which a film will stretch in a given direction before breaking upon being subjected to tension in that direction at room temperature at a constant rate of 100% per minute.

In the above examples, tensile strength was measured on an Instron tensile testing machine (Model TT–B, Instron Engineering Company, Quincy, Mass.). This machine produces a load-elongation chart from which may be calculated the tensile strength (tensile breaking strength), the modulus (elastic modulus or stiffness) and elongation (residual or machine elongation). The tensile strength and modulus are expressed in terms of force per area based on the cross sectional area of the film.

The tear strength (tear resistance) is the force required to tear the film in either direction as measured in grams per mil of film thickness. In the above examples, tear strength was measured on an Elmendorf Tear Tester (Albert Instrument Corporation, Philadelphia, Pa.). This device has a stationary jaw, a movable jaw mounted on a pendulum which swings on a substantially frictionless bearing, and a means for measuring the maximum arc through which the pendulum swings. The film to be tested is placed between the jaws, slit to the proper width, and the pendulum is released. The point at which the pendulum stops after tearing the film is recorded and the tear strength calculated therefrom.

The preferred material which comprises the supporting films utilized in the composite tape structure of this invention is polyethylene terephthalate which is disclosed in Whinfield and Dickson U.S. Patent No. 2,465,319. The polyethylene terephthalate may be prepared by the condensation of ethylene glycol and terephthalic acid or preferably by an esterification reaction between ethylene glycol and an ester forming derivative of terephthalic acid or an ester thereof such as a dialkyl terephthalate, e.g., dimethyl terephthalate, and polymerizing the monomeric reaction product.

It is to be understood, however, that the present invention comprehends as the material of the supporting film any synthetic linear terephthalate ester polymer derived by reacting a glycol selected from the group having the formula $HO(CH_2)_nOH$ where $n$ is an integer from 2 to 10 inclusive, terephthalic acid or an ester forming derivative thereof or a low molecular weight alkyl ester thereof, and from 0 to 20% by weight of a second acid or ester thereof, said second acid being selected from the group which includes isophthalic acid, bibenzoic acid, sebacic acid, hexahydroterephthalic acid, adipic acid, azaleic acid, napthalic acid, 2,5-dimethyl terephthalic acid and bis-p-carboxy ethane.

The orientation by stretching of the polyester film may take place in a continuous, easily controlled manner on conventional stretching equipment, of the type disclosed in U.S. Patents No. 2,728,941, 2,755,533 and 2,767,435, and Scarlet U.S. Patent No. 2,823,421.

The magnetic recording tape of this invention is preferably made by casting a thin layer of a magnetic material dispersed in a suitable binder onto a highly polished casting surface moving at a uniform speed, coating one surface of a thin supporting film with an adhesive, or alternatively applying an adhesive to the layer of magnetic material, moving the supporting film into an adhesive contact with the magnetic layer to form a magnetic recording tape and subsequently stripping said tape from the casting surface. This process, which results in a tape having a surface smoothness of about 2 to 8 microinches (root mean square), is described in Alles and Saner, U.S. application Ser. No. 611,049, filed Sept. 20, 1956, and now Patent No. 3,009,847.

An outstanding feature of the magnetic recording tape of this invention resides in the ability of the tape to record and play back without substantial difference in the length of time required for recording and play back. Where such errors or time difference occurs, a resultant error and confusion occurs in radio and television timing, as well as fidelity of the reproduction. For example, it has been noted that where a 40° F. increase in temperature and a 40% increase in relative humidity occurs between recording and play back, there is a resultant error in a one-half hour recorded program as high as 7 to 8 seconds using conventional prior art magnetic recording tapes. Novel tapes of this invention would under similar conditions exhibit a difference in program timing of only about one-half second, which is one quarter that exhibited by a magnetic tape having as its support a substantially uniformly oriented polyester film.

An important advantage of this invention is that magnetic recording tape can be made of superior strength compared with prior art tapes, while at the same time being substantially thinner, even as thin as from 0.0005 to 0.001 inch. The difference in thickness permits the storage of approximately twice the linear footage of tape per reel. Another advantage of the reduced thickness lies in the ability of the tape to conform more readily to the surface of the recording and reproducing heads, thus resulting in improved reproduction.

Additional advantages of the magnetic recording tape of this invention include its outstanding tensile strength, modulus, tear strength, dimensional stability and its reduced deformation under tension.

The invention claimed is:

1. Magnetic recording tape comprising a thin layer of a magnetically susceptible material dispersed in a binder coated on a flexible support, said support comprising a polymeric linear terephthalate ester film which has been oriented to a greater extent in the longitudinal direction than in the transverse direction by stretching from 3.4× to 5.0× in the longitudinal direction and from 1.2× to 3.0× in the transverse direction.

2. Magnetic recording tape as set forth in claim 1 wherein said oriented film has been heat set at a temperature between about 140° and 200° C.

3. Magnetic recording tape as set forth in claim 1 wherein said film is from 0.0005 to 0.001 inch in thickness.

4. Magnetic recording tape as set forth in claim 1 wherein said layer has a surface smoothness of 2 to 8 microinches (root mean square).

5. Magnetic recording tape comprising a thin layer of a magnetically susceptible material dispersed in a binder coated on a flexible support, said support comprising a polymeric linear terephthalate ester film which has been oriented by stretching from 3.4× to 6.0× in the longitudinal direction and from 1.2× to 4.0× in the transverse direction, the amount of stretch in the longitudinal direction exceeding the amount of stretch in the transverse direction by at least 1.0×

6. Magnetic recording tape as set forth in claim 5 wherein said oriented film has been heat set at a temperature between about 140° C. and 250° C.

References Cited

UNITED STATES PATENTS

| | | |
|---|---|---|
| 2,566,441 | 9/1951 | Camras. |
| 2,627,088 | 2/1953 | Alles et al. |
| 2,641,592 | 6/1953 | Hofrichter. |
| 2,671,034 | 3/1954 | Steinfeld. |
| 2,688,567 | 9/1954 | Franck. |
| 2,767,435 | 10/1956 | Alles. |
| 2,804,401 | 8/1957 | Cousino. |
| 2,819,186 | 1/1958 | Franck. |
| 2,851,733 | 9/1958 | Pangonis. |
| 2,884,663 | 5/1959 | Alles. |
| 2,075,484 | 3/1961 | Ambroski. |

R. D. NEVIUS, *Primary Examiner.*

WILLIAM D. MARTIN, *Assistant Examiner.*